Patented Aug. 26, 1952

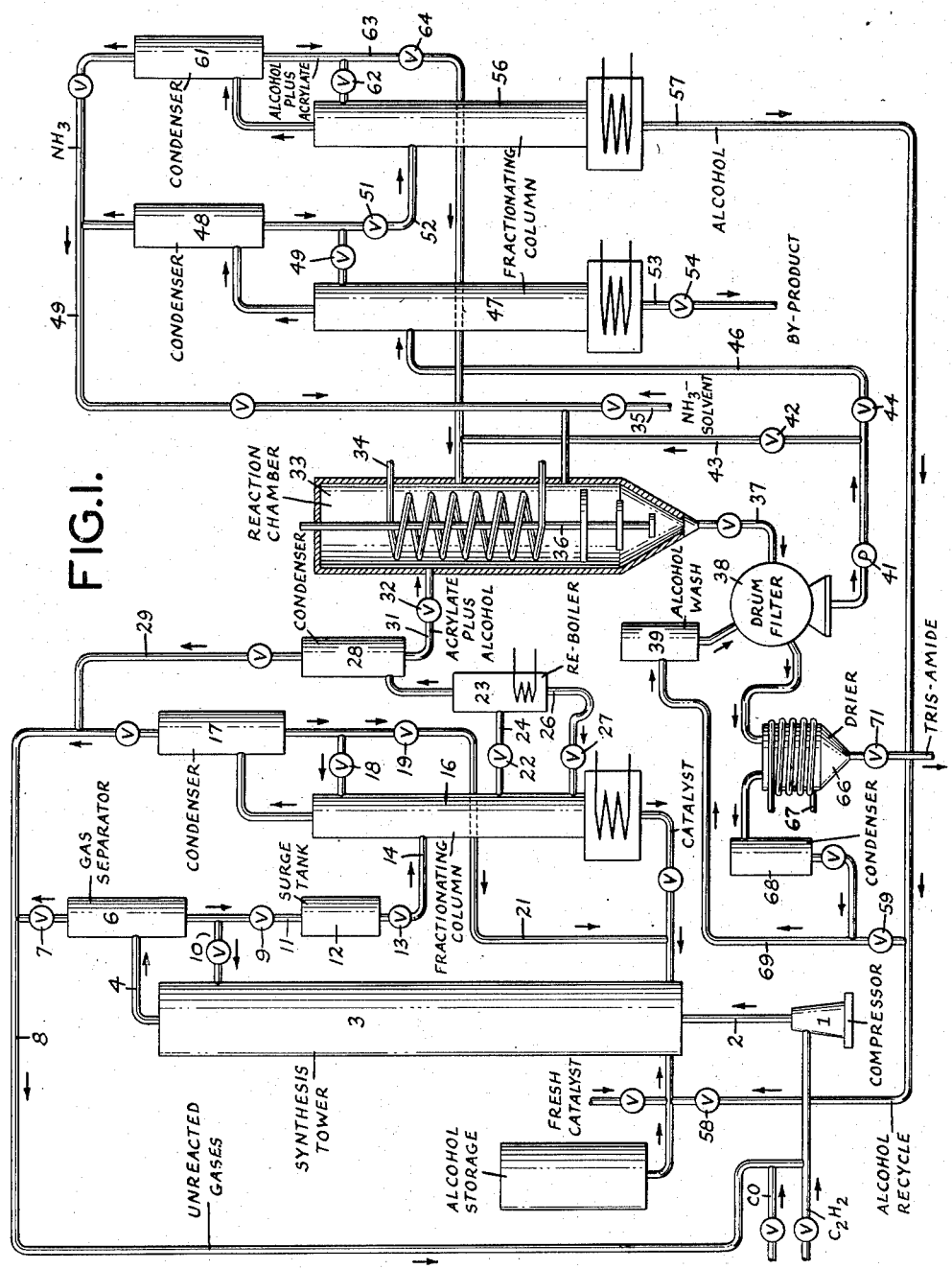

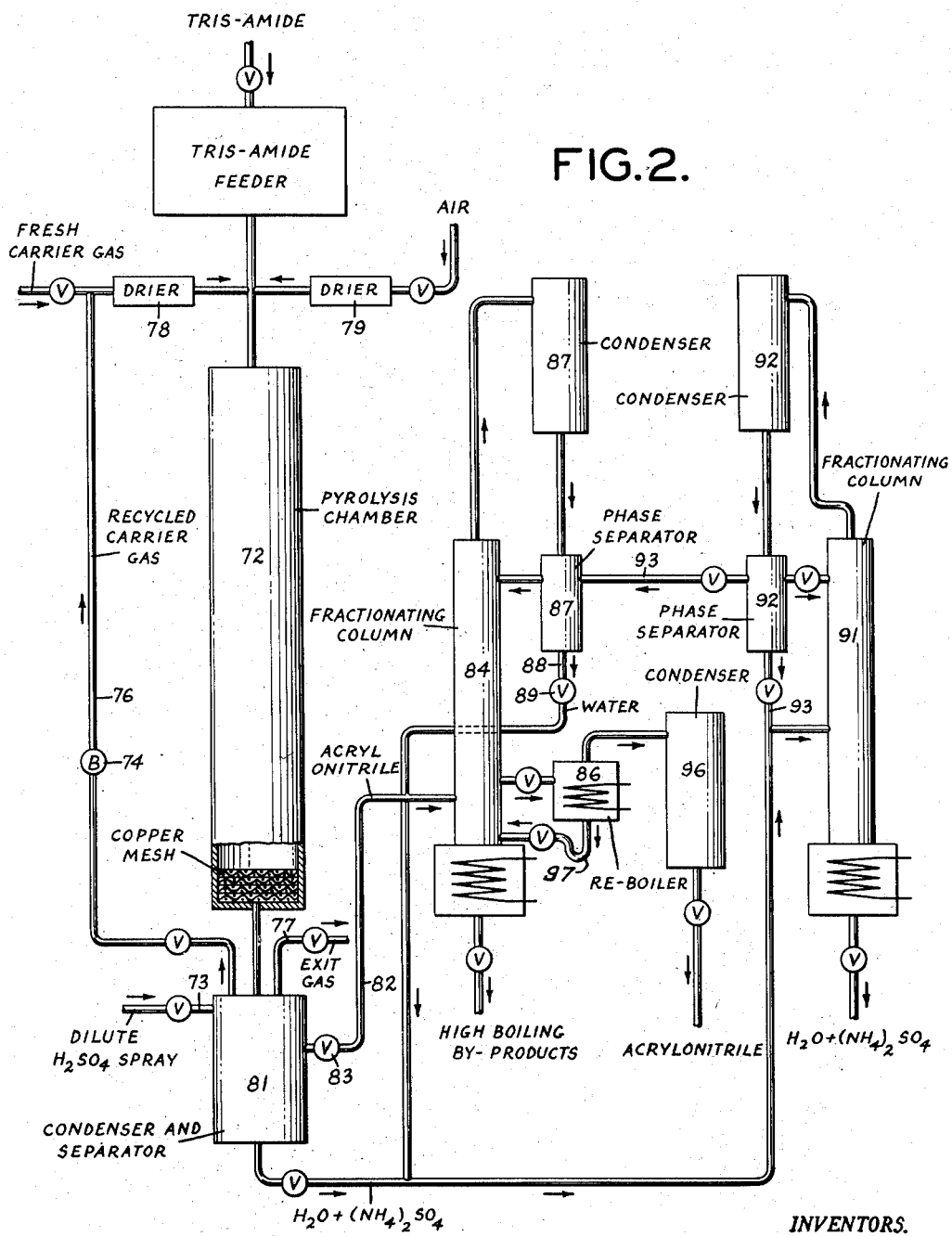

2,608,576

UNITED STATES PATENT OFFICE 2,608,576

ACRYLONITRILE SYNTHESIS

Edward W. Pietrusza and John N. Cosby, Morristown, N. J., assignors to Allied Chemical & Dye Corporation, New York, N. Y., a corporation of New York Application October 29, 1949, Serial No. 124,395

2 Claims. (Cl. 260—465.2)

This invention relates to synthesis of acrylonitrile.

Problems confronting the art in the field of acrylonitrile synthesis have been to develop processes based on readily available, inexpensive starting materials, using only simple catalysts, and giving in high yields a product easily freed of any impurities which tend adversely to affect polymerizability, color of the polymer, etc. The principal objects of this invention are to present solutions to the above and other problems confronting the art.

We have now found that high quality acrylonitrile is produced by pyrolysis of the compound 3,3,3 nitrilotrispropanamide, the formula for which is $N(CH_2CH_2CONH_2)_3$.

Acrylates are suitable for preparation of said tris-amide by reaction with ammonia, and are easily available, e. g. by synthesis from acetylene, carbon monoxide, and an alcohol. Alcohol employed to form an acrylate may easily be recovered for reuse after conversion of acrylate to tris-amide, as will be pointed out more particularly hereinafter. Accordingly, in a preferred embodiment of the present invention, high quality acrylonitrile is obtained via 3,3,3 nitrilotrispropanamide pyrolysis, employing only acetylene, carbon monoxide, and ammonia starting materials.

Our invention will now be more particularly described with reference to the accompanying drawings, which are flow sheets illustrating diagrammatically one preferred mode of embodying the same.

The drawings illustrate the 3 principal steps of a preferred embodiment of our process and the interrelation of said steps; Figure 1 illustrating mode of synthesizing acrylate by reaction of acetylene, carbon monoxide, and an alcohol; and mode of synthesizing, from acrylate and ammonia, 3,3,3-nitrilotrispropanamide and recovering alcohol from reuse in step (1). Figure 2 illustrates mode of pyrolyzing tris-amide from step (2) or other source.

Commencing the description with the acrylate synthesis step: acetylene, and carbon monoxide in amounts to make up, with recycled carbonyl, stoichiometric proportions with the acetylene, are compressed by compressor 1 and led via pipe 2 into a stainless steel synthesis tower 3, containing recycled alcohol and any fresh alcohol required for make up, recycled metal carbonyl formed from catalyst and carbon monoxide, and recycled catalyst and any fresh catalyst required for make up.

Methanol may be taken as exemplary of alcohols used in our process. Preferably tower 3 is filled to the top to utilize its full volume for the reaction. The catalyst is preferably a halide of nickel, especially about 1-2%, by weight of the alcohol, of nickel bromide or nickel iodide. The operating temperatures in synthesis tower 3 are ordinarily about 130°-185° C. and the operating pressures are ordinarily superatmospheric, e. g. about 5-50 atmospheres. Reaction rates are greater, the greater the operating pressure. Reaction is suitably carried to about 40%–80% concentration by weight of methyl acrylate.

Unreacted gases issuing from the synthesis tower via line 4 separate from liquid products in gas separator 6 and are withdrawn for recycle via valve 7 and line 8. Liquid products containing 40–80% acrylate and 60–20% alcohol by weight flow from gas separator 6 via valve 9 and line 11 into surge tank 12, and thence via valve 13 and line 14 to fractionating column 16. A polymerization inhibitor may be employed in the more concentrated acrylate solutions.

A portion of the liquid product from separator 6 is recirculated to synthesis tower 3 through valved pipe 10; the quantity of product recirculated is controlled to bring the ultimate conversion of methyl alcohol to acrylate up to 40–80% by weight acrylate concentration.

In fractionating column 16, gases, nickel carbonyl, and methanol-methyl acrylate azeotrope are taken off overhead at a temperature of about 40°-63° C.; a product side stream is withdrawn part way up the column at a temperature of about 63°-80° C. and residue containing the catalyst is drawn off from the bottom for recycle. Nickel carbonyl and methanol-methyl acrylate azeotrope in the overhead from fractionating column 16 are condensed in condenser 17 and separated into a reflux stream controlled by valve 18 and a recycle stream controlled by valve 19 and passing through pipe 21 back to synthesis tower 3. Gases from condenser 17 pass via line 8 back to synthesis tower 3. The product side stream, controlled by valve 22, is passed into reboiler 23 via line 24.

Residue from reboiler 23 is returned via line 26 and valve 27 to column 16. Gases and vapors from the reboiler, coming off at about 65° C. to 80° C., are passed to condenser 28, wherein vapors are condensed. The gases pass through line 29, together with recycled gases for recycle to acrylate synthesis tower 3. The condensate issuing from condenser 28 consists typically of at least about 46% acrylate and the balance chiefly alcohol.

This crude acrylate-alcohol product requires no further purification. It is passed directly via line 31, controlled by valve 32, to reaction chamber 33 for reaction with ammonia, preferably in presence of a hydroxylated solvent, especially those of elevated dielectric constant such as ethylene glycol, glycerol, water, etc. to form 3,3,3-nitrilotrispropanamide and alcohol corresponding to the acrylate used. Preferred processes for effecting the desired reaction of ammonia and an acrylate are disclosed and claimed in the copending application of one of us (Edward W. Pietrusza) Serial No. 119,990, filed October 6, 1949. In these preferred processes the acrylate corresponds to a saturated monohydric alcohol having 1-4 carbon atoms in the molecule, especially methyl alcohol, and ammonia is present in excess. Ethylene glycol and glycerine are particularly effective and are preferred as reaction media when a higher ester (e. g. ethyl, propyl, or butyl acrylate) is employed as reactant.

Acrylate-ammonia reaction chamber 33 is provided with cooling coil 34 and agitator 36. Operating temperatures are preferably about room temperature (25-30° C.) or below, e. g. down to minus 20° C. Required make-up ammonia and solvent reaction medium are introduced into reaction chamber 33 via valved line 35.

Crude solid 3,3,3 nitrilotrispropanamide, ordinarily about 90% pure, is precipitated in reaction chamber 33 and a slurry is discharged via line 37 to drum filter 38 wherein crude solid tris-amide is separated from mother liquors, and washed, suitably with alcohol corresponding to the acrylate employed in forming the tris-amide, drawn from storage tank 39.

A part of the mother liquors and wash liquors separated in the filter is returned to reaction chamber 33 by pump 41 via valve 42 and line 43 to serve as reaction medium in the next cycle, and another part is bled off through valve 44 and line 46 for separation of reaction medium and by-products, and recovery of alcohol.

Suitably, the alcohol recovery is effected in a first fractionating column 47 wherein an overhead fraction is taken off at about 63°-65° C. Vapors are condensed in condenser 48, from which ammonia is withdrawn via line 49 for reuse in the tris-amide synthesis. The condensed vapors, consisting chiefly of alcohol with some acrylate, are divided into a reflux stream controlled by valve 49 and a product stream passing via valve 51 and pipe 52 to a second fractionating column 56.

Reaction medium and by-products collect as residue in the base of column 47 and are withdrawn via line 53 controlled by valve 54. The by-products contain constituents pyrolyzable to acrylonitrile and accordingly the by-products are suitably submitted to pyrolysis together with or separately from the crude tris-amide.

In fractionating column 56, alcohol is collected as residue and recycled via line 57 and valve 58 for reuse in acrylate synthesis. A branch of line 57, controlled by valve 59, allows taking off recovered alcohol for delivery to alcohol wash tank 39. The distillate from column 56, coming off at about 65° C., is chiefly ammonia, alcohol, and any residual acrylate. It is condensed in condenser 61 from which ammonia is withdrawn for recycle via pipe 49, reflux is returned via valved line 62 to column 56, and alcohol and acrylate are recycled via line 63 and valve 64 to reaction chamber 33.

The crude tris-amide produce is dried in drier 66 heated by steam coil 67. Alcohol vapors drawn off are condensed in condenser 68 and returned via line 69 to tank 39. Tris-amide is withdrawn via a double valve arrangement 71.

This crude tris-amide (or, if desired, 3,3,3 nitrilotrispropanamide from any other source) is fed into pyrolysis chamber 72 (Fig. 2). Very satisfactory results are obtained when this chamber contains a solid contact material, silica gel or manganese oxide for example. Operating temperatures are chosen to produce reaction in a reasonable time. The best choice of temperatures will depend to some extent on choice of contact material. A suitable range of temperature is, for example, between about 450° C. and about 550° C., as measured by a thermocouple in the hottest zone of the pyrolysis chamber, when silica gel or manganese oxide is used as a contact material.

In order to sweep the pyrolysis products (chiefly acrylonitrile, water and ammonia) through the pyrolysis chamber it is advantageous to maintain a flow of carrier gases through the chamber. The carrier gases may be carbon dioxide, nitrogen, steam or the like and may contain sufficient oxygen or air to burn off deposits of tar or carbon which might otherwise accumulate in the pyrolysis zone. Acrylonitrile is not highly sensitive under the conditions of pyrolysis and therefore the rate of introduction of tris-amide and carrier gases to the pyrolysis chamber is not highly critical in obtaining good yields of acrylonitrile.

It is desirable for smooth operation to avoid possible undue accumulation of tris-amide in the relatively cool portions of the pyrolysis chamber near the point of introduction of tris-amide. Such accumulations may be avoided by providing mechanical agitation of hot solid contact material (such as powdered or pelleted silica gel or other solid contact material) in the inlet zone of the pyrolysis chamber; or by using fluidized solid contact material in the pyrolysis chamber.

Regeneration of the contact material, when required, is suitably effected, if a stationary bed is used, by passing air thereover to burn off deposits using temperatures of say 500°-600° C.; or if the contact material is fluidized, the contact material is suitably regenerated by separating it from reaction products and passing it through a regenerating chamber wherein deposits are burned off with air.

The products issuing from the pyrolysis chamber are subjected to a neutralization treatment to remove any free ammonia contained therein by a spray of dilute sulfuric acid, 73. When carbon dioxide or other acid-forming gas or vapor is present in the pyrolysis mixture in amounts at least equivalent to the ammonia formed in the pyrolysis the ammonia forms a salt (e. g. ammonium carbonate) and therefore need not be otherwise neutralized.

Provision is made for recycling carrier gas via blower 74 and line 76 and for bleeding off gases via vent 77—e. g. if air is added to the carrier gases to oxidize deposits in the pyrolysis chamber, gases must be released to prevent build up. Likewise, if air is used to regenerate activity of a stationary bed of contact material in the pyrolysis chamber, venting of exhaust gases is necessary.

Driers and/or condensers 78 and 79 are interposed to remove water from gases passed through the pyrolysis chamber since otherwise water would build up as a result of its formation in the tris-amide pyrolysis reaction.

The product vapors are condensed and separated in condenser-separator 81 into an aqueous layer containing dissolved ammonium salt and an organic layer, mostly acrylonitrile. The organic layer passes via overflow line 82 controlled by valve 83 to fractionating column 84 wherein a product side stream is separated at about 76°–78° C. and passed to reboiler 86.

An acrylonitrile-water azeotrope is taken off overhead at about 70°–75° C. in fractionating column 84; it is condensed in an azeotropic head condenser 87 wherein it is separated into an organic phase which is returned to the column and an aqueous phase which is withdrawn via line 88 and valve 89. High boiling by-products are withdrawn at the bottom of column 84.

The combined aqueous layers are passed to fractionating column 91, wherein aqueous ammonium salt is withdrawn as residue and acrylonitrile-water azeotrope is taken off at about 70°–75° C. as distillate and separated in azeotropic head condenser 92 into layers. The organic layer in part returns via line 93 to column 84 and in part refluxes into the top of column 91. The aqueous layer refluxes into the lower section of column 91, via line 93.

In reboiler 86, acrylonitrile entering via line 94 from column 84 is flash distilled and is then condensed in condenser 96 and withdrawn as final product in better than 90% yields on entering crude tris-amide. (The impurities associated with the tris-amide form a certain amount of acrylonitrile.) The residue in the reboiler is returned via line 97 to column 84.

Acrylonitrile produced by our process is found to be of high quality, substantially pure, and free of color forming and inhibitor impurities. Overall yields of acrylonitrile by our process above-described, based on acetylene consumed, reach 85% of theory or better.

The foregoing description of apparatus and procedure is intended only to be illustrative of suitable means for carrying out our process, and is not intended in a limiting sense. It will be clear to one skilled in the art that the apparatus and procedures described may be extensively modified or may be replaced by other apparatus and procedures without departure from the scope of our invention. For example, in the tris-amide pyrolysis step, instead of solid tris-amide which is fed to the pyrolysis chamber, a solution of tris-amide is suitable, e. g. tris-amide in the form of an aqueous solution of its formate salt. Numerous other modifications and changes of like scope may be made.

Appropriate pumps, conveyors, tanks, valves, control instruments, and other conventional items of equipment are employed at desired locations.

Operative temperatures are not confined to the range of 450°–550° C. above set forth. Any temperatures may be used which are sufficiently high to melt and vaporize the solid starting material and to bring about its pyrolysis under the conditions of catalyst, contact time, etc. in the reaction zone; however, the temperatures are desirably low enough to minimize side reactions such as decomposition of acrylonitrile to acetylene and hydrogen cyanide. The broad range of temperature employed is accordingly from about 350° C. to about 700° C., the lower temperatures being more suitable the more active the catalyst and the longer the contact time employed.

We claim:

1. A process for synthesis of acrylonitrile which comprises introducing 3,3,3-nitrilotrispropanamide into a pyrolysis zone, pyrolyzing said tris-amide in vapor phase in presence of silica gel contact material at temperatures in the range between about 350° C. and about 700° C. with formation of acrylonitrile, and recovering acrylonitrile from the 3,3,3-nitrilotrispropanamide pyrolysis products.

2. Process as defined in claim 1, wherein temperatures in the hottest part of the pyrolysis zone are between about 450° C. and about 550° C.

EDWARD W. PIETRUSZA.
JOHN N. COSBY.

REFERENCES CITED

The following references are of record in the file of this patent:

UNITED STATES PATENTS

| Number | Name | Date |
| --- | --- | --- |
| 2,120,933 | Dittmar | June 14, 1938 |
| 2,373,190 | Kung | Apr. 10, 1945 |
| 2,375,005 | Kung | May 1, 1945 |
| 2,401,429 | Kung | June 4, 1946 |

OTHER REFERENCES

Peck et al.: "Interview with W. J. Reppe," Fiat Final Report Number 273, pages 10–11 (Oct. 2, 1945).